United States Patent
Altonen et al.

(10) Patent No.: US 9,707,709 B2
(45) Date of Patent: Jul. 18, 2017

(54) METHOD FOR INJECTION MOLDING AT LOW, SUBSTANTIALLY CONSTANT PRESSURE

(75) Inventors: Gene Michael Altonen, West Chester, OH (US); Charles John Berg, Jr., Wyoming, OH (US); Ralph Edwin Neufarth, Liberty Township, OH (US); Gary Francis Schiller, Asheboro, NC (US); John Moncrief Layman, Liberty Township, OH (US); Rainer Scharrenberg, Marburg (DE)

(73) Assignee: IMFLUX INC, Hamilton, OH (US)

( * ) Notice: Subject to any disclaimer, the term of this patent is extended or adjusted under 35 U.S.C. 154(b) by 251 days.

(21) Appl. No.: 13/476,197

(22) Filed: May 21, 2012

(65) Prior Publication Data
US 2012/0295050 A1    Nov. 22, 2012

Related U.S. Application Data (60) Provisional application No. 61/488,555, filed on May 20, 2011.

(51) Int. Cl.
*B29C 45/18* (2006.01)
*B29C 45/77* (2006.01)

(52) U.S. Cl.
CPC .... *B29C 45/77* (2013.01); *B29C 2945/76498* (2013.01); *B29C 2945/76859* (2013.01);
(Continued)

(58) Field of Classification Search
CPC .......... B29C 45/77; B29C 2945/76498; B29C 2945/76859; B29C 2945/76862
(Continued)

(56) References Cited

U.S. PATENT DOCUMENTS 2,871,516 A * 2/1959 Sherman et al. ............. 425/145
2,944,288 A * 7/1960 Sherman ................. 264/37.27
(Continued)

FOREIGN PATENT DOCUMENTS

DE         2427969 A1    1/1976
DE    102009046835 A1    5/2011
(Continued)

OTHER PUBLICATIONS

Hegberg et al. "Mixed Plastics Recycling Technology", Noyes Data Corporation, University of Illinois, pp. 94-109.*
(Continued)

*Primary Examiner* — Jill Heitbrink
(74) *Attorney, Agent, or Firm* — Marshall, Gerstein & Borun LLP (57) ABSTRACT

Disclosed herein is a method of injection molding at low, substantially constant melt pressures. Embodiments of the disclosed method now make possible a method of injection molding that is more energy—and cost—effective than conventional high-velocity injection molding processes. Embodiments of the disclosed method surprisingly allow for the filling of a mold cavity at low melt pressure without undesirable premature hardening of the thermoplastic material in the mold cavity and without the need for maintaining a constant temperature or heated mold cavity. Heretofore, it would not have been expected that a constant pressure method could be performed at low pressure without such premature hardening of the thermoplastic material when using an unheated mold cavity or cooled mold cavity.

4 Claims, 5 Drawing Sheets (52) U.S. Cl.
CPC .............. *B29C 2945/76862* (2013.01); *Y10T 428/1397* (2015.01)

(58) Field of Classification Search
USPC .......................................... 264/37.27, 328.1
See application file for complete search history.

(56) References Cited

U.S. PATENT DOCUMENTS

| | | | |
|---|---|---|---|
| 3,025,567 A * | 3/1962 | Sherman .................. | 264/328.19 |
| 4,219,322 A * | 8/1980 | Chang et al. ................. | 425/547 |
| 5,350,288 A | 9/1994 | Kimoto et al. | |
| 5,407,342 A | 4/1995 | Boucher et al. | |
| 5,411,686 A | 5/1995 | Hata | |
| 5,419,858 A | 5/1995 | Hata et al. | |
| 5,478,520 A | 12/1995 | Kasai et al. | |
| 5,518,389 A | 5/1996 | Nonomura et al. | |
| 5,716,561 A | 2/1998 | Guergov | |
| 5,728,329 A | 3/1998 | Guergov | |
| 5,773,038 A * | 6/1998 | Hettinga ....................... | 425/145 |
| 5,853,630 A | 12/1998 | Hettinga | |
| 5,902,525 A | 5/1999 | Hettinga | |
| 5,935,505 A | 8/1999 | Whetten et al. | |
| 6,090,318 A | 7/2000 | Bader et al. | |
| 6,372,162 B1 | 4/2002 | Szchech | |
| 6,464,909 B1 | 10/2002 | Kazmer et al. | |
| 6,616,871 B1 | 9/2003 | Iimura et al. | |
| 6,824,379 B2 | 11/2004 | Doyle et al. | |
| 7,419,625 B2 | 9/2008 | Vasapoli et al. | |
| 7,785,090 B2 | 8/2010 | Amano et al. | |
| 7,910,029 B2 | 3/2011 | Koumaro | |
| 8,235,694 B2 | 8/2012 | Nam | |
| 2001/0013672 A1 | 8/2001 | Kawamura et al. | |
| 2008/0064805 A1 | 3/2008 | Uosaki et al. | |
| 2008/0143006 A1 | 6/2008 | Honma et al. | |
| 2012/0035327 A1 | 2/2012 | Ciarafoni et al. | |
| 2012/0291885 A1 | 11/2012 | Altonen et al. | |
| 2012/0292823 A1 | 11/2012 | Altonen et al. | |
| 2012/0294963 A1 | 11/2012 | Altonen et al. | |
| 2012/0295049 A1 | 11/2012 | Altonen et al. | |
| 2012/0328724 A1 | 12/2012 | Altonen et al. | |
| 2012/0329948 A1 | 12/2012 | Altonen et al. | |
| 2013/0295219 A1 | 11/2013 | Neufarth et al. | |
| 2013/0295220 A1 | 11/2013 | Neufarth et al. | |

FOREIGN PATENT DOCUMENTS

| | | |
|---|---|---|
| GB | 2164895 A | 4/1986 |
| JP | 60127125 | 7/1985 |
| JP | 2098417 A | 4/1990 |
| JP | 3079317 A | 4/1991 |
| JP | 4126214 A | 4/1992 |
| JP | 5006914 A | 1/1993 |
| JP | 1993-009907 U | 2/1993 |
| JP | 7223242 A | 8/1995 |
| JP | 1997-521503 | 12/1997 |
| JP | 11262936 | 9/1999 |
| JP | 2000280276 A | 10/2000 |
| JP | 2005215497 | 8/2005 |
| WO | WO-95/29802 | 11/1995 |

OTHER PUBLICATIONS

Schnerr-Haeselbarth O:"Der Heisse Draht Ins Werkzeug Werkseuginnendruck-Basierte Systeme Steigern Die Produktivitat Und Senken Die Kosten", Kunstoffe International, Carl Hanser Verlag, Munchen DE, vol. 92, No. 7, Jul. 1, 2002, pp. 56-60.
Wikipedia: "Low Pressure Molding", pp. 1-4, XP002681936, Internet: http://en.wikipedia.org/wiki/Low_pressure_molding.
Homes W et al: "Spritzgiessprozesse in Echtzeit Regeln Eine Neue Technik Zur Aktiven Angussbalancierung", Kunstoffe International. Carl Hanser Verlag, Munchen DE, vol. 91, No. 1, Jan. 1, 2001, pp. 68-70.
Suh et al., "Structure Development of Various Polyolefins in Injection Molding", Antec 2006, Society of Plastics Engineers, 2006, pp. 760-765.
International Search Report, U.S. Appl. No. 13/476,045, dated Aug. 17, 2012, 14 pages.
International Search Report, U.S. Appl. No. 13/476,045, dated Aug. 16, 2012, 12 pages.
International Search Report, U.S. Appl. No. 13/476,073, dated Sep. 3, 2012, 16 pages.
International Search Report, U.S. Appl. No. 13/476,197, dated Aug. 16, 2012, 11 pages.
International Search Report, U.S. Appl. No. 13/476,178, dated Aug. 17, 2012, 13 pages.
International Search Report, U.S. Appl. No. 13/476,584, dated Aug. 17, 2012, 13 pages.
U.S. Appl. No. 61/602,781, filed Feb. 24, 2012, Altonen et al.
U.S. Appl. No. 61/602,650, filed Feb. 24, 2012, Berg, Jr. et al.
U.S. Appl. No. 13/601,359, filed Aug. 31, 2012, Neufarth et al.
U.S. Appl. No. 13/765,428, filed Feb. 12, 2013, Neufarth et al.
U.S. Appl. No. 13/476,584, filed May 21, 2012, Altonen et al.
U.S. Appl. No. 13/601,514, filed Aug. 31, 2012, Altonen et al.
U.S. Appl. No. 13/672,246, filed Nov. 8, 2012, Altonen et al.
U.S. Appl. No. 13/682,456, filed Nov. 20, 2012, Altonen et al.
U.S. Appl. No. 61/728,764, filed Nov. 20, 2012, Altonen et al.
U.S. Appl. No. 61/729,028, filed Nov. 21, 2012, Altonen et al.
Alcoa:"QC-10 The aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.
"Specialized Aluminum Products for Tool and Mold Applications", May/Jun. 2003 issue of Aluminum Now journal of the Aluminum Association, Inc., 4 pages.
Ampco Metal, "Ampcoloy®944: A new copper-silicon-chromium alloy for the Moldmaking Industry", brochure, 2 pages, www.ampcometal.com.
Ampco Metal, "Ampcoloy®944", brochure, 2 pages, www.ampcometal.com.
Clinton Aluminum & Stainless Steel, "Why aluminum mold?" presentation, Oct. 30, 2006, 20 pages, toll free # 800-826-3370.
European Tool & Mould Making ETMM, "High strength, hardness, thermal conductivity characterize copper mould making alloy", online article Dec. 9, 2011, 2 pages, http://www.etmm-online.com/materials/articles/353445/.
Ampco Metal Inc., "Procurable Alloys", online article Nov. 2011, 5 pages, http://www.modernmetals.com/item/10715-procurable-alloys.html.
Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.
David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.
United States Patent and Trademark Office, online Trademark Electronic Search System, Moldmax HH, 2 pages, http://tess2.uspto.gov/bin/showfield?f=doc&state=4808:k8aqoi.3.8.
Rhoda Miel, "Aluminating Tooling", PlasticsNews.com online article Apr. 27, 2009, 2 pages, http://www.plasticsnews.com/article/20090427/NEWS/304279985/aluminating-tooling.
Joseph Pryweller, "Aluminum Injection Mold", online article from PlasticsNews.com, Jan. 13, 2003, 2 pages, http://aluminuminjectionmold.com/articles.html.
David Bank et al., "Why Plastic Flows Better in Aluminum Injection Molds", plastics technology article Sep. 2008, 8 pages.
Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.

(56) References Cited

OTHER PUBLICATIONS

A L Kelly, et al, "The effect of copper alloy mold tooling on the performance of the injection molding process", online article from The Free Library, 10 pages, http://www.thefreelibrary.com/The+effect+of+copper+alloy+mold+tooling+on+the+performance.
United States Patent and Trademark Office, online Trademark Electronic Search System, QC 10, 2 pages, http://tess2.uspto.gov/bin/showfield?f=doc&state=4810:7di60m.2.1.
Thyssenkrupp Materials NA, "QC-10 Aluminum Mold Plate", brochure, 4 pages.
Uddeholm, "Moldmax HH", brochure, 8 pages, www.uddeholm.com.
Li et al., Automatic Layout Design of Plastic Injection Mould Cooling System, Computer-aided Design 37 (2005) 645-662.
International Search Report, U.S. Appl. No. 13/682,456, dated Aug. 2, 2013, 11 pages.
U.S. Appl. No. 61/861,298, filed Aug. 1, 2013, Altonen et al.
U.S. Appl. No. 61/861,304, filed Aug. 1, 2013, Altonen et al.
U.S. Appl. No. 61/861,310, filed Aug. 1, 2013, Altonen et al.
U.S. Appl. No. 14/085,515, filed Nov. 20, 2013, Altonen et al.
U.S. Appl. No. 14/086,356, filed Nov. 20, 2013, Altonen et al.
Communication pursuant to Article 94(3) EPC, European patent application No. 12724807.8, dated Jul. 20, 2016.
Notice of Preliminary Rejection, Korean patent application No. 2016-7015857, Jul. 25, 2016.

\* cited by examiner

METHOD FOR INJECTION MOLDING AT LOW, SUBSTANTIALLY CONSTANT PRESSURE

CROSS REFERENCE TO RELATED APPLICATION

This application claims the benefit of U.S. Provisional Application No. 61/488,555, filed May 20, 2011.

BACKGROUND

Field of the Disclosure

The present disclosure relates to methods for injection molding and, more particularly, to methods for injection molding at low, substantially constant melt pressures.

Brief Description of Related Technology

Injection molding is a technology commonly used for high-volume manufacturing of parts made of meltable material, most commonly of parts made of plastic. During a repetitive injection molding process, a thermoplastic resin, most often in the form of small beads, is introduced to an injection molding machine that melts the resin beads under heat and pressure. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. A molded part may have one or more gates. It is common for large parts to have two, three, or more gates to reduce the flow distance the polymer must travel to fill the molded part. The one or multiple gates per cavity may be located anywhere on the part geometry, and possess any cross-section shape such as being essentially circular or be shaped with an aspect ratio of 1.1 or greater. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold.

The molten plastic resin is injected into the mold cavity and is forcibly pushed through the cavity by the injection molding machine until the plastic resin reaches the location in the cavity furthest from the gate. The resulting length and wall thickness of the part is a result of the shape of the mold cavity.

While it may be desirous to reduce the wall thickness of injected molded parts to reduce the plastic content, and thus cost, of the final part; reducing wall thickness using a conventional injection molding process can be an expensive and a non-trivial task, particularly when designing for wall thicknesses less than 1.0 millimeter. As a liquid plastic resin is introduced into an injection mold in a conventional injection molding process, the material adjacent to the walls of the cavity immediately begins to "freeze," or solidify, or cure, because the liquid plastic resin cools to a temperature below the material's no flow temperature and portions of the liquid plastic become stationary. As the material flows through the mold, a boundary layer of material is formed against the sides of the mold. As the mold continues to fill, the boundary layer continues to thicken, eventually closing off the path of material flow and preventing additional material from flowing into the mold. The plastic resin freezing on the walls of the mold is exacerbated when the molds are cooled, a technique used to reduce the cycle time of each part and increase machine throughput.

There may also be a desire to design a part and the corresponding mold such that the liquid plastic resin flows from areas having the thickest wall thickness towards areas having the thinnest wall thickness. Increasing thickness in certain regions of the mold can ensure that sufficient material flows into areas where strength and thickness is needed. This "thick-to-thin" flow path requirement can make for inefficient use of plastic and result in higher part cost for injection molded part manufacturers because additional material must be molded into parts at locations where the material is unnecessary.

One method to decrease the wall thickness of a part is to increase the pressure of the liquid plastic resin as it is introduced into the mold. By increasing the pressure, the molding machine can continue to force liquid material into the mold before the flow path has closed off. Increasing the pressure, however, has both cost and performance downsides. As the pressure required to mold the component increases, the molding equipment must be strong enough to withstand the additional pressure, which generally equates to being more expensive. A manufacturer may have to purchase new equipment to accommodate these increased pressures. Thus, a decrease in the wall thickness of a given part can result in significant capital expenses to accomplish the manufacturing via conventional injection molding techniques.

Additionally, when the liquid plastic material flows into the injection mold and freezes, the polymer chains retain the high levels of stress that were present when the polymer was in liquid form. These "molded-in" stresses can lead to parts that undesirably warp or sink following molding, have reduced mechanical properties, and have reduced resistance to chemical exposure. The reduced mechanical properties are particularly important to control and/or minimize for injection molded parts such as thinwall tubs, living hinge parts, and closures.

SUMMARY

In accordance with an embodiment of the disclosure, a method includes (a) filling with a shot comprising a molten thermoplastic material a mold cavity of a molding apparatus, and (b) while filling substantially the entire mold cavity with the shot comprising the molten thermoplastic material, maintaining the melt pressure substantially constant at less than 6000 psi. The thermoplastic material has a melt flow index of 0.1 g/10 min to about 500 g/10 min.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

All pressures disclosed herein are gauge pressures, which are pressures relative to ambient pressure.

Disclosed herein is a method of injection molding at low, substantially constant melt pressures. Embodiments of the disclosed method now make possible a method of injection molding that is more energy—and cost—effective than conventional high-velocity injection molding process. Embodiment of the disclosed method surprisingly allow for the filling of a mold cavity at low melt pressure without undesirable premature hardening of the thermoplastic material in the mold cavity and without the need for maintaining a constant temperature or heated mold cavity. As described in detail below, one of ordinary skill in the art would not have expected that a constant pressure method could be performed at low pressure without such premature hardening of the thermoplastic material when using an unheated mold cavity or cooled mold cavity.

Embodiments of the disclosed method also allow for the formation of quality injection molded parts that do not experience undesirable sink or warp without the need to balance the pre-injection mold cavity pressure and the pre-injection pressure of the thermoplastic materials. Thus, embodiments of the disclosed method can be performed using atmospheric mold cavities pressures and eliminate the need for including pressurizing means in the mold cavity.

Embodiments of the method can also produce quality injection molded parts with significantly less sensitivity to variations in the temperature, viscosity, and other such properties of the thermoplastic material, as compared to conventional high pressure injection molding process. In one embodiment, this can advantageously allow for use of thermoplastic materials formed from recycled plastics (e.g., post consumer recycled plastics), which inherently have batch-to-batch variation of the material properties.

Additionally, the low melt pressures used in the disclosed method can allow for use of low hardness, high thermal conductive mold cavity materials that are more cost effective to manufacture and are more energy efficient. For example, the mold cavity can be formed of a material having a surface hardness of less than 30 Rockwell C (Rc) and a thermal conductivity of greater than 30 BTU/HR FT ° F. In one embodiment, the mold cavity can be formed of an aluminum alloys, such as, for example aluminum alloys 6061 Al and 7075 Al.

Embodiments of the disclosed method can further allow for the formation of high quality thin-walled parts. For example, a molded part having a length of molten thermoplastic flow to thickness (L/T) ratio of greater than 100 can be formed using embodiments of the method. It is contemplated the embodiments of the method can also form molded parts having an L/T ratio greater than 200, and in some cases greater than 250.

Molded parts are generally considered to be thin-walled when a length of a flow channel L divided by a thickness of the flow channel T is greater than 100 (i.e., L/T>100). For mold cavities having a more complicated geometry, the L/T ratio may be calculated by integrating the T dimension over the length of the mold cavity 32 from a gate 102 to the end of the mold cavity 32, and determining the longest length of flow from the gate 102 to the end of the mold cavity 32. The L/T ratio can then be determined by dividing the longest length of flow by the average part thickness. In the case where a mold cavity 32 has more than one gate 30, the L/T ratio is determined by integrating L and T for the portion of the mold cavity 32 filled by each individual gate and the overall L/T ratio for a given mold cavity is the highest L/T ratio that is calculated for any of the gates.

Figure 1:
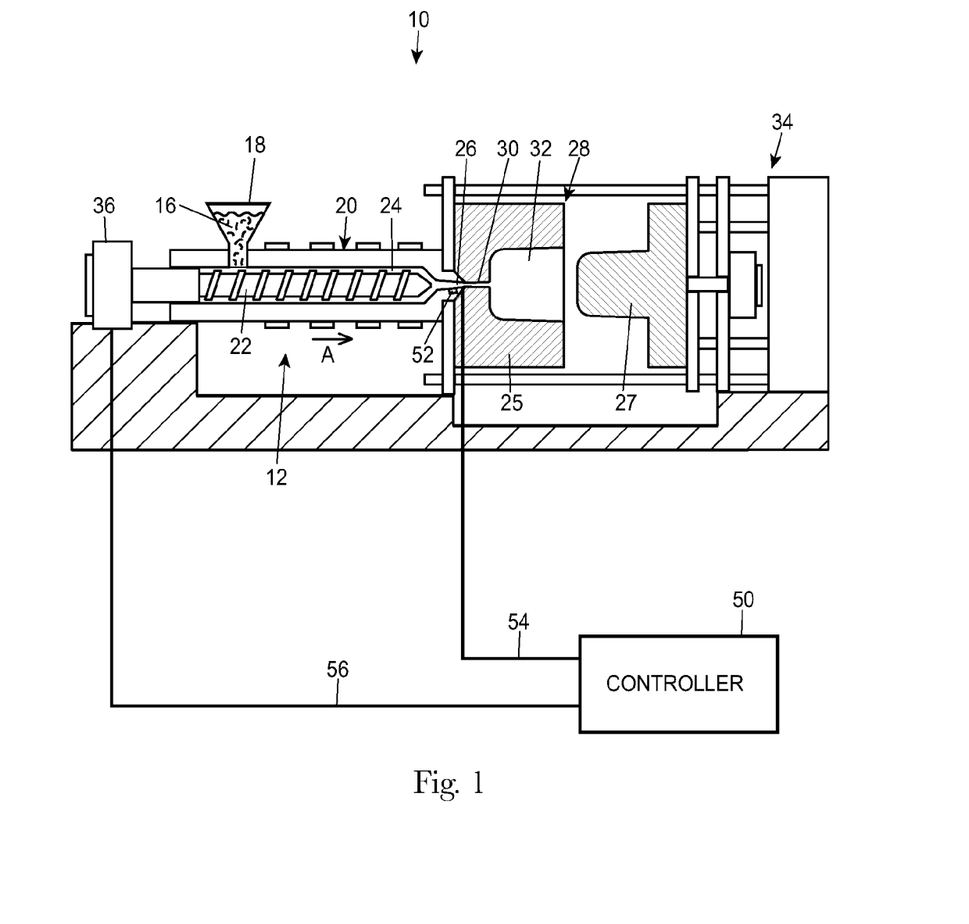
FIG. 1 illustrates a diagrammatic front view of a high velocity injection molding machine according to one or more embodiments shown and described herein.

FIG. 1 illustrates an exemplary injection molding apparatus 10 for use with embodiments of the disclosed process. The injection molding apparatus 10 generally includes an injection system 12 and a clamping system 14. A thermoplastic material may be introduced into the injection system 12 in the form, for example, of pellets 16. The pellets 16 may be placed into a hopper 18, which feeds the pellets 16 into a heated barrel 20 of the injection system 12. The pellets 16, after being fed into the heated barrel 20, may be driven to the end of the heated barrel 20 by a reciprocating screw 22. The heating of the heated barrel 20 and the compression of the pellets 16 by the reciprocating screw 22 causes the pellets 16 to melt to form a molten thermoplastic. The molten thermoplastic material is typically processed at a temperature of about 130° C. to about 410° C.

The reciprocating screw 22 forces the molten thermoplastic material is forced towards a nozzle 26 to form a shot comprising molten thermoplastic material 24, which will be injected into the mold cavity 32 of a mold 28. The mold cavity 32 is formed between first and second mold parts 25, 27 of the mold 28 and the first and second mold parts 25, 27 are held together under pressure by a press or clamping unit 34. The press or clamping unit 34 applies a clamping force that needs to be greater than the force exerted by the injection pressure acting to separate the two mold halves during the molding process to hold the first and second mold parts 25, 27 together while the molten thermoplastic material 24 is injected into the mold cavity 32. To support these clamping forces, the clamping system 14 may include a mold frame and a mold base, the mold frame and the mold base being formed from a material having a surface hardness of more than about 165 BHN and preferably less than 260 BHN, although materials having surface hardness BHN values of greater than 260 may be used as long as the material is easily machineable, as discussed further below.

Once the shot comprising molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (A set of dissimilar mold cavities may be considered a family of mold cavities).

Figure 2:
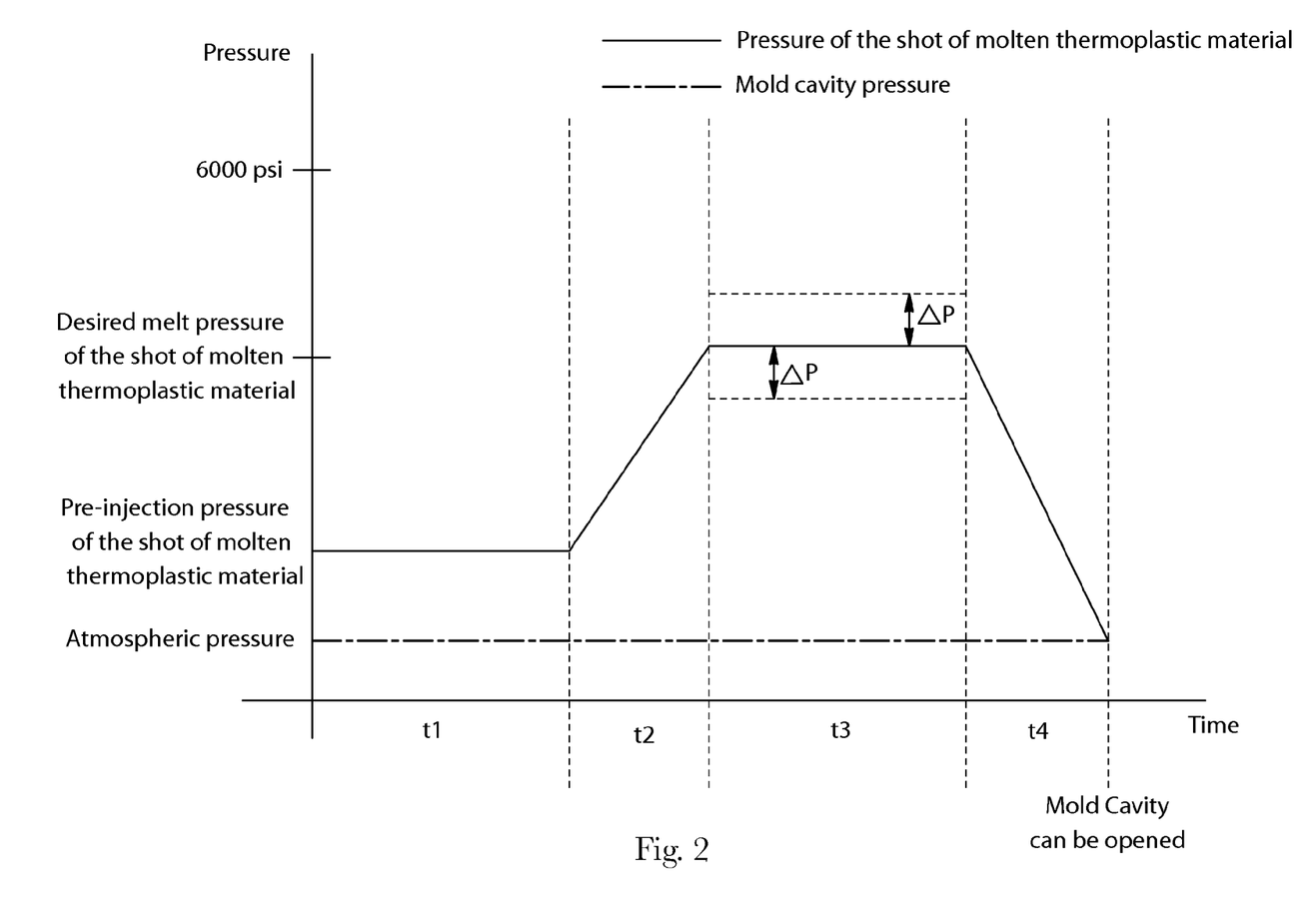
FIG. 2 is a schematic illustration of a pressure profile for a method of injection molding at low, substantially constant pressure in accordance with an embodiment of the disclosure.
Figure 3:
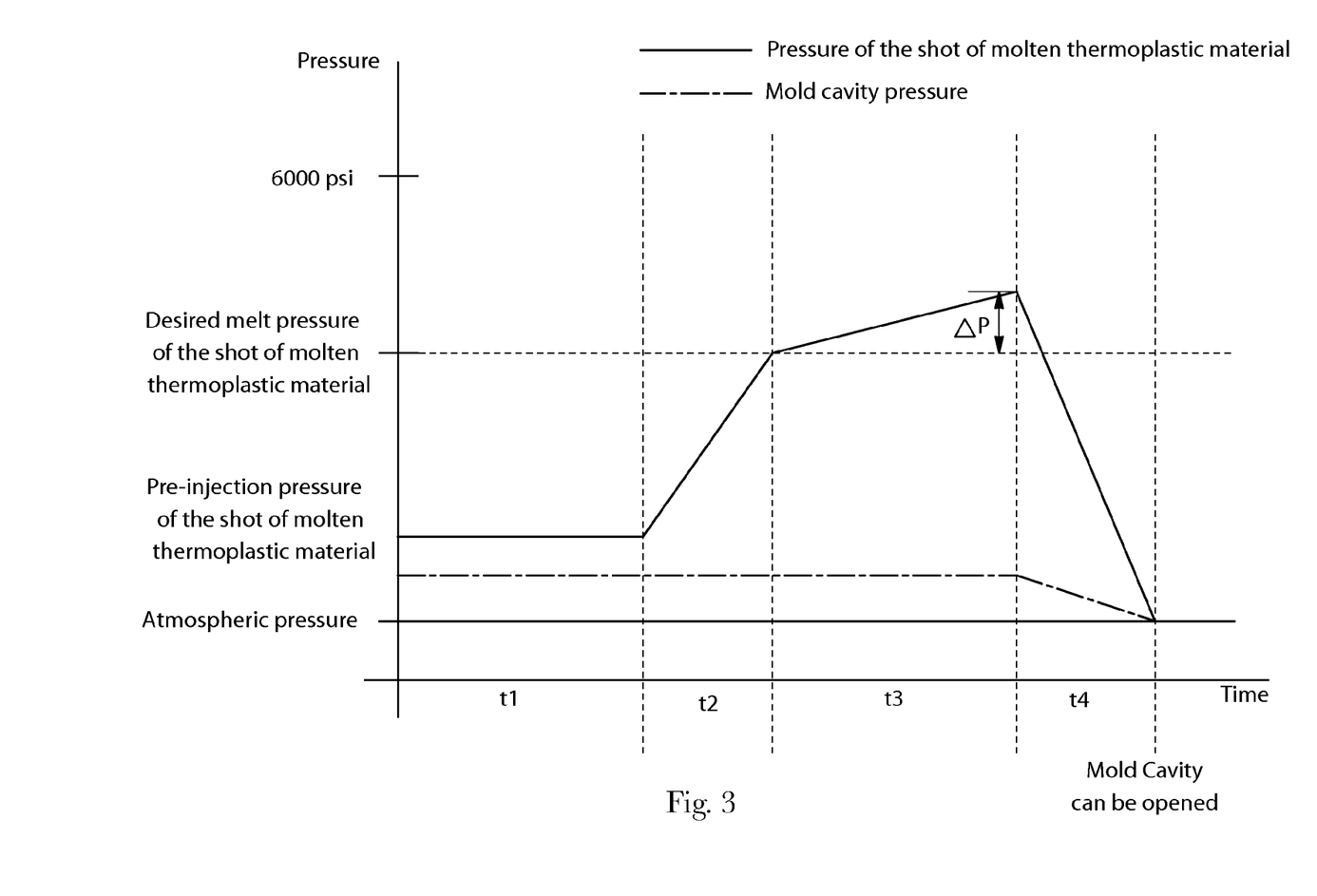
FIG. 3 is a schematic illustration of a pressure profile for a method of injection molding at low, substantially constant pressure in accordance with another embodiment of the disclosure.
Figure 4:
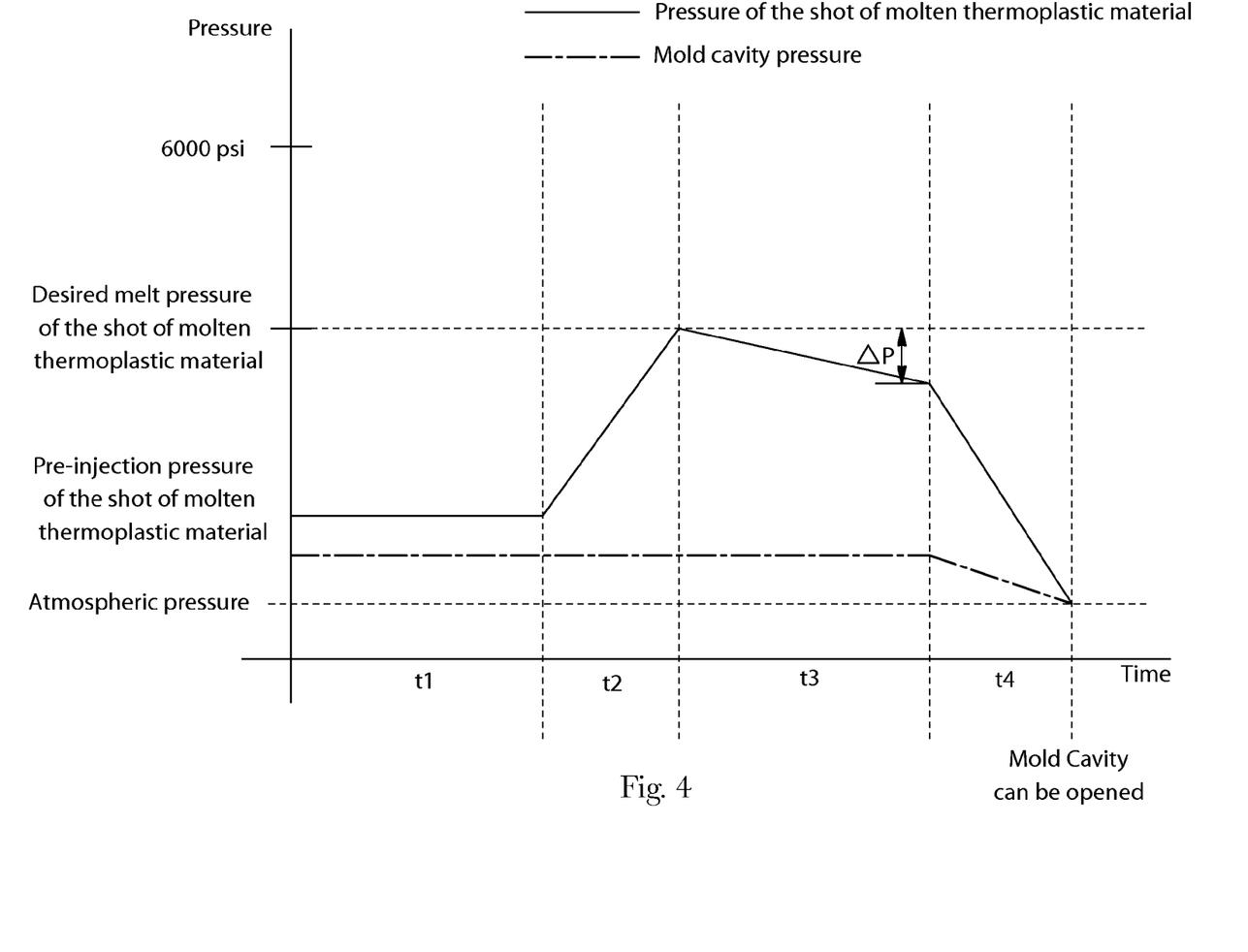
FIG. 4 is a schematic illustration of a pressure profile for a method of injection molding at low, substantially constant pressure in accordance with an embodiment of the disclosure.

The method generally includes injecting the shot comprising molten thermoplastic material into the mold cavity 32 to fill the mold cavity. Referring to FIG. 2, at t1, which is prior to injection, the shot comprising molten thermoplastic material has a pre-injection pressure. As used herein, the pre-injection pressure of the shot comprising molten thermoplastic material refers to the pressure of the thermoplastic material after it has been heated into a molten state in the heated barrel and prepared into the shot, and just prior to injection of the shot comprising the molten thermoplastic material into the mold cavity or a runner or feed system in fluid communication with the nozzle and the mold cavity. The pre-injection pressure of the shot comprising molten thermoplastic material can optionally be unequal to the pressure of the mold cavity prior to injection. In one embodiment, prior to injection the mold cavity can be at atmospheric pressure, for example, as shown in FIGS. 2 and 4. In another embodiment, the mold cavity can have a slight positive pressure, as shown in FIG. 3. In yet another embodiment a vacuum can be induced in the mold cavity.

As illustrated in FIG. 2, upon injection into the mold cavity during t2, the pressure of the shot comprising molten thermoplastic material increases to a melt pressure that is greater than the pre-injection pressure of the shot comprising molten thermoplastic material. Referring again to FIG. 1, for example, injection of the shot comprising molten thermoplastic material can include translating the reciprocating screw 22 in the direction of arrow A in FIG. 1, toward the nozzle 26, to force the shot comprising molten thermal plastic material 24 through the nozzle 26 and into the mold cavity 32. In various embodiments, the shot comprising molten thermoplastic material 24 may be injected into the mold cavity 32 of a mold 28 through a gate 30, which directs the flow of the molten thermoplastic material 24 to the mold cavity 32. The mold cavity 32 can be formed, for example, between first and second mold parts 25, 27 of the mold 28. The first and second mold parts 25, 27 of the mold 28 can be held together under pressure by a press 34.

Referring again to FIG. 2, substantially the entire mold cavity or the entire mold cavity is filled with the shot comprising molten thermoplastic materials at time t3. The melt pressure is maintained at a substantially constant pressure of less than 6000 psi during filling of substantially the entire mold cavity. As used herein, the term "substantially constant pressure" refers to a pressure that does not fluctuate upwardly or downwardly from the desired melt pressure more than 30% of the desired melt pressure during filling of substantially the entire mold cavity with the shot comprising molten thermoplastic material. For example, the substantially constant pressure can fluctuate (either as an increase or decrease) from the melt pressure about 0% to about 30%, about 2% to about 25%, about 4% to about 20%, about 6% to about 15%, and about 8% to about 10%. Other suitable fluctuation amounts includes about 0, 2, 4, 6, 8, 10, 12, 14, 16, 18, 20, 22, 24, 26, 28, and 30%. The fluctuation is illustrated in FIG. 2 as a ΔP from the desired melt pressure. Without intending to be bound by theory, it is believed that maintaining a substantially constant pressure as defined herein can prevent hesitation of the melt front as the molten thermoplastic material flows into the mold cavity. Such dynamic flow conditions can advantageously allow the shot comprising molten thermoplastic material to maintain uniform flow and packing conditions to the last point of fill of the mold without freezing or other disruption in the molten material. As illustrated in FIGS. 3 and 4, the melt pressure during filling of substantially the entire mold cavity can increase or decrease, respectively, for example, at a constant rate, and be considered substantially constant so long as the maximum increase or decrease in the melt pressure during filling of substantially the entire mold cavity is no greater than the 30% of the desired melt pressure. Again, this fluctuation is illustrated in FIGS. 3 and 4 as a ΔP from the desired melt pressure.

Figure 5:
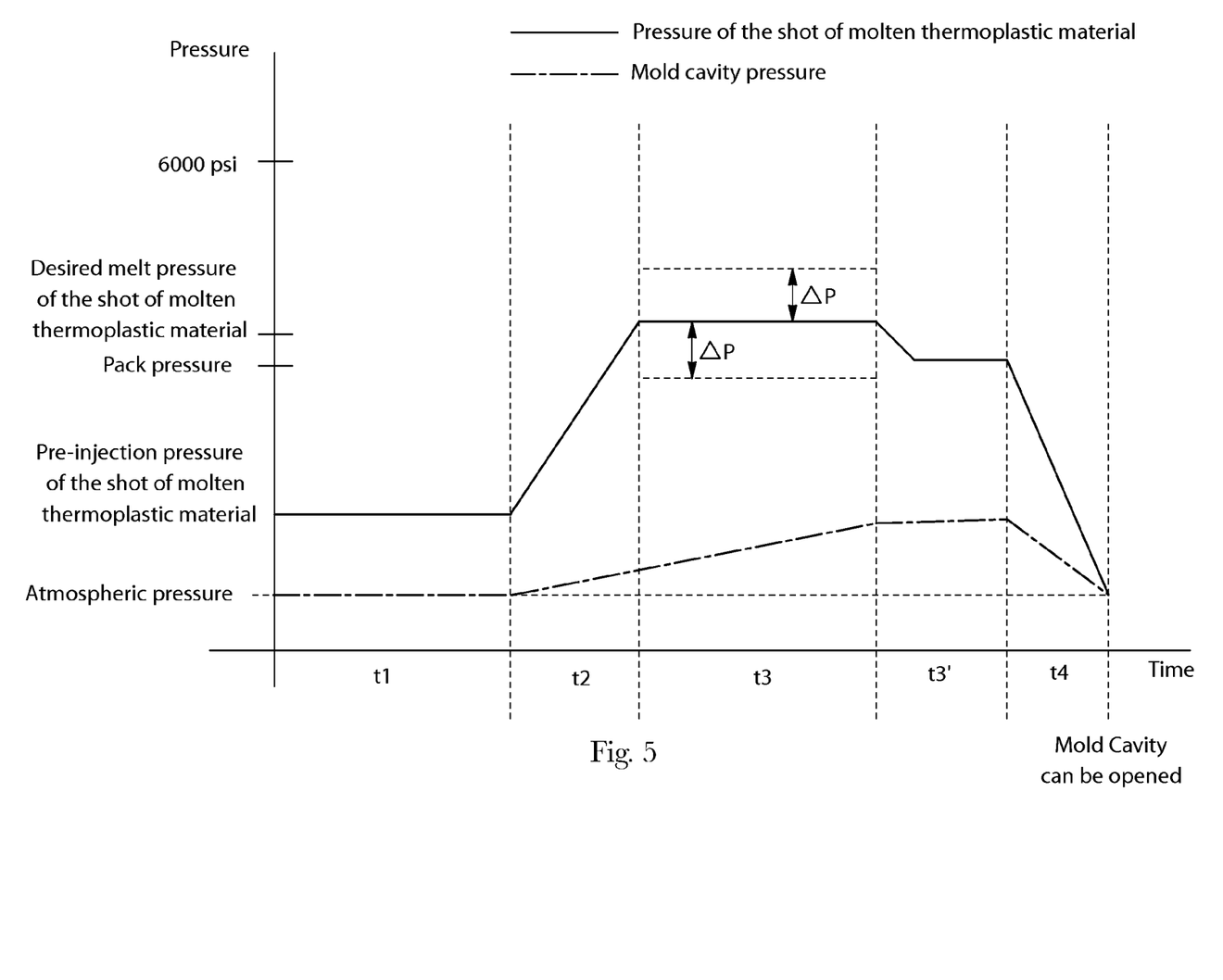
FIG. 5 is a schematic illustration of a pressure profile for a method of injection molding at low, substantially constant pressure in accordance with yet another embodiment of the disclosure.

Referring to FIG. 5 and discussed in detail below, once substantially the entire mold cavity is filled (at time t3), the melt pressure can be reduced to a pack pressure to fill the remaining portion of the mold cavity (at time t3'). The pack pressure can be maintained substantially constant until the entire mold cavity is filled.

A sensor may be located near the end of fill in the mold cavity. This sensor may provide an indication of when the mold front is approaching the end of fill in the cavity. The sensor may sense pressure, temperature, optically, or other means of identifying the presence of the polymer. When pressure is measured by the sensor, this measure can be used to communicate with the central control unit to provide a target "packing pressure" for the molded component. The signal generated by the sensor can be used to control the molding process, such that variations in material viscosity, mold temperatures, melt temperatures, and other variations influencing filling rate, can be adjusted for by the central control unit. These adjustments can be made immediately during the molding cycle, or corrections can be made in subsequent cycles. Furthermore, several readings can be averaged over a number of cycles then used to make adjustments to the molding process by the central control unit. In this way, the current injection cycle can be corrected based on measurements occurring during one or more cycles at an earlier point in time. In one embodiment, sensor readings can be averaged over many cycles so as to achieve process consistency.

Once the mold cavity is completely filled, the melt pressure and the mold cavity pressure, if necessary, are reduced to atmospheric pressure at time t4 and the mold cavity can be opened. During this time, the reciprocating screw 22 stops traveling forward. Advantageously, the low, substantially constant pressure conditions allow the shot comprising molten thermoplastic material to cool rapidly inside the mold, which, in various embodiments, can occur substantially simultaneously with venting of the melt pressure and the mold cavity to atmospheric pressure. Thus, the injection molded part can be ejected from the mold quickly after filling of the mold cavity with the shot comprising molten thermoplastic material.

Melt Pressure

As used herein, the term "melt pressure" refers to a pressure of a shot comprising molten thermoplastic material as it is injected into and fills a mold cavity of a molding apparatus. During filling of substantially the entire mold cavity, the melt pressure of the shot comprising molten thermoplastic material is maintained substantially constant at less than 6000 psi. The melt pressure of the shot comprising molten thermoplastic material during filling of substantially the entire mold cavity is significantly less than the injection and filling melt pressures used in conventional injection molding processes and recommended by manufacturers of thermoplastic materials for use in injection molding process. Other suitable melt pressures include, for example, less than 5000 psi, less than 4500 psi, less than 4000 psi, and less than 3000 psi. For example, the melt pressure can be maintained at a substantially constant pressure within the range of about 1000 psi to less than 6000 psi, about 1500 psi to about 5500 psi, about 2000 psi to about 5000 psi, about 2500 psi to about 4500 psi, about 3000 psi to about 4000 psi, and about 3000 psi to less than 6000 psi.

As described above, a "substantially constant pressure" refers to a pressure that does not fluctuate upwardly or downwardly from the desired melt pressure more than 30% of the desired melt pressure during filling of substantially the entire mold cavity with the shot comprising molten thermoplastic material. For example, the substantially constant pressure can fluctuate (either as an increase or decrease) from the melt pressure about 0% to about 30%, about 2% to about 25%, about 4% to about 20%, about 6% to about 15%, and about 8% to about 10%. Other suitable fluctuation amounts includes about 0, 2, 4, 6, 8, 10, 12, 14, 16, 18, 20, 22, 24, 26, 28, and 30%. The fluctuation is illustrated in FIG. 2 as a ΔP from the desired melt pressure. Referring to FIGS. 3 and 4, the melt pressure during filling of substantially the entire mold cavity can increase or decrease, respectively, for example, at a constant rate, and be considered substantially constant so long as the maximum increase or decrease in the melt pressure during filling of substantially the entire mold cavity is no greater than the 30% of the desired melt pressure. Again, this fluctuation is illustrated in FIGS. 3 and 4 as a ΔP from the desired melt pressure. In yet another embodiment, the melt pressure during filling of substantially the entire mold cavity can increase over a portion of time t3 and then decrease over a remaining portion of time t3. This fluctuation will be considered a substantially constant pressure so long as the maximum increase or decrease in the melt pressure during filing is less than 30% of the desired melt pressure.

The melt pressure of the shot comprising thermoplastic material upon injection into the mold cavity can be measured using, for example, a pressure transducer disposed at the injection point. As used herein, the "injection point" is the location in the molding apparatus where the shot comprising molten thermoplastic material enters the mold cavity. For example, for a molding apparatus having a single mold cavity coupled to a nozzle, the injection point can be at or adjacent to the nozzle. Alternatively, for a molding apparatus having a plurality of mold cavities and a runner system for transporting the molten thermoplastic material from the nozzle to each of the mold cavities, the injection points can be the points of contact between the runner system and each of the individual mold cavities. The shot comprising molten thermoplastic material is maintained at the substantially constant melt pressure as it is transported through the runner system. In general, the runner system is a heated runner system that maintains the melt temperature of the shot comprising molten thermoplastic material as it is transported to the mold cavities.

The melt pressure of the shot comprising thermoplastic material during filling of substantially the entire mold cavity can be maintained, for example, by measuring the melt pressure using a pressure transducer disposed at the nozzle and maintaining a constant pressure at the nozzle upon injection into the mold cavity. In another embodiment, the melt pressure of the shot comprising thermoplastic material during filing of substantially the entire mold cavity can be measured using a pressure transducer disposed in the mold cavity opposite the gate.

The cavity percent fill is defined as the % of the cavity that is filled on a volumetric basis. Thus, if a cavity is 95% filled, then the total volume of the mold cavity that is filled is 95% of the total volumetric capacity of the mold cavity. Substantially the entire mold cavity is filled when at least at least 70%, at least 72%, at least 74%, at least 76, at least 78%, at least 80%, at least 82%, at least 84%, at least 86%, at least 88%, at least 90%, at least 92%, at least 94%, at least 96%, at least 98%, or at least 99% of the mold cavity is filled with the molten thermoplastic material. For example, substantially the entire mold cavity is filled when about 70% to about 100%, about 75% to about 99%, about 80% to about 98%, or about 90% to about 95% of the mold cavity is filled with the molten thermoplastic material. The percentage of the mold cavity filled with the shot comprising molten thermoplastic material can be determined, for example, by placing a pressure transducer in the mold cavity at the end of fill point of the mold cavity corresponding to the desired fill percentage. The pressure transducer alerts the operator when the shot comprising molten thermoplastic material has reached the desired fill percentage.

Referring to FIG. 5, in one embodiment, once substantially the entire mold cavity is filled (at the end of time t3), a reduced melt pressure may be used to fill and pack the remaining portion of the mold cavity (time t3'). The melt pressure of the shot comprising molten thermoplastic material can be reduced to a pack pressure less than the melt pressure once substantially the entire mold cavity is filled to provide an ideal pressure for filling the remaining portion of the mold cavity and prevent over pressurization or over packing of the mold cavity. The remaining portion of the mold cavity can be filled while maintaining the melt pressure of the shot comprising molten thermoplastic material substantially constant at the pack pressure. The pack pressure can be, for example, at least 50%, at least 55%, at least 60%, at least 65%, at least 70%, at least 75%, at least 80%, at least 85%, at least 90%, at least 95%, or at least 99% of the melt pressure.

In another embodiment, once substantially the entire mold cavity is filled, the melt pressure can be increased to fill and pack the remaining portion of the mold cavity.

Maintaining Substantially Constant Pressure

In one embodiment, a hydraulic pressure is applied to the shot comprising molten thermoplastic material 24 to inject the shot comprising molten thermoplastic material 24 into the mold cavity at the melt temperature. The hydraulic pressure can be applied, for example, by translating the reciprocating screw 22 in the direction of arrow A in FIG. 1, toward the nozzle 26, to force the shot comprising molten thermal plastic material 24 through the nozzle 26 and into the mold cavity 32. The melt pressure is then maintained substantially constant during filling of the shot comprising molten thermoplastic material 24 into the mold cavity 32 by monitoring the melt pressure of the shot comprising the molten thermoplastic material 23 upon injection into the mold cavity 32 and the melt pressure of the shot comprising the molten thermoplastic material 24 during filling of the mold cavity 32, and adjusting the hydraulic pressure applied to the shot comprising the molten thermoplastic material during injection into the mold cavity. The melt pressure can be monitored using pressure transducers disposed at the injection point, for example, the nozzle 26, and in the mold cavity 32.

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. The sensor 52 need not be in direct contact with the injected fluid and may alternatively be in dynamic communication with the fluid and able to sense the pressure of the fluid and/or other fluid characteristics. If the sensor 52 is not located within the nozzle 26, appropriate correction factors may be applied to the measured characteristic to calculate the melt pressure in the nozzle 26. In yet other embodiments, the sensor 52 need not be disposed at a location which is fluidly connected with the nozzle. Rather, the sensor could measure clamping force generated by the clamping system 14 at a mold parting line between the first and second mold parts 25, 27. In one aspect the controller 50 may maintain the pressure according to the input from sensor 52.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent over pressurization of the mold 28. Another alternative mechanism for preventing over pressurization of the mold 28 is to activate an alarm when an over pressurization condition is detected.

Thus in another embodiment, the molding apparatus can include a pressure relief valve disposed between an injection point and the mold cavity. The pressure relief valve has a predetermined pressure set point, which is equal to desired melt pressure for injection and filling of the mold cavity. The melt pressure during injection and filling of the mold cavity is maintained substantially constant by applying a pressure to the shot comprising molten thermoplastic material to force the shot comprising molten thermoplastic material through the pressure relief valve at a melt pressure higher than the predetermined set point. The pressure relief valve then reduces the melt pressure of the shot comprising the thermoplastic material as it passes through the pressure relief valve and is injected into the mold cavity. The reduced melt pressure of the shot comprising molten thermoplastic material corresponds to the desired melt pressure for filling of the mold cavity and is maintained substantially constant by the predetermined set point of the pressure release valve.

In one embodiment, the melt pressure is reduced by diverting a portion of the shot comprising thermoplastic material to an outlet of the pressure relief valve. The diverted portion of the shot comprising thermoplastic material can be maintained in a molten state and can be reincorporated into the injection system, for example, through the heated barrel.

Mold Cavity

The molding apparatus includes a mold having at least one mold cavity. The mold can include any suitable number of mold cavities. Embodiments of the method disclosed herein advantageously allow for use of molds having asymmetrically oriented mold cavities and/or mold cavities having different shapes. The use of the low, substantially constant filling pressures of embodiments of the method can allow for each mold cavity to be filled under balanced packing conditions despite asymmetry in the mold cavity arrangement. Thus, quality injection molded parts can be formed in each of the mold cavities of the mold despite the asymmetric orientation. The ability to asymmetrically arrange the mold cavities of a mold can advantageously allow for high mold cavity density in a mold, thereby allowing for an increased number of injection molded parts to be formed by a single mold and/or allowing for a reduction in the size of the mold.

Mold Cavity Pressure

As used herein, the "mold cavity pressure" refers to the pressure within a closed mold cavity. The mold cavity pressure can be measured, for example, using a pressure transducer placed inside the mold cavity. In embodiments of the method, prior to injection of the shot comprising molten thermoplastic material into the mold cavity, the mold cavity pressure is different than the pre-injection pressure of the shot comprising molten thermoplastic material. For example, the mold cavity pressure can be less than the pre-injection pressure of the shot comprising molten thermoplastic material. In another embodiment, the mold cavity pressure can be greater than the pre-injection pressure of the shot comprising molten thermoplastic material. For example, the mold cavity pressure prior to injection can be at least 10%, at least 15%, at least 20%, at least 25%, at least 30%, at least 40%, or at least 50% different (greater or less than) than the pre-injection pressure of the shot comprising molten thermoplastic material. In one embodiment, the mold cavity pressure is at least 15 psi different (greater or less than) the pre-injection pressure of the shot comprising molten thermoplastic material. Referring to FIGS. 2 and 4, in various embodiments, the mold cavity pressure prior to injection can be atmospheric pressure. In other embodiments, for example, as shown in FIG. 3, the mold cavity pressure can have a pressure greater than atmospheric pressure. In yet another embodiment, the mold cavity can be maintained at a vacuum prior to injection.

In various embodiments, the mold cavity pressure can be maintained substantially constant during filling of substantially the entire mold cavity with the shot comprising molten thermoplastic material. The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material do not meaningfully change. The term "substantially constant" in this respect includes deviations of up to approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

For example, the substantially constant pressure can fluctuate (either as an increase or decrease) from the melt pressure about 0% to about 30%, about 2% to about 25%, about 4% to about 20%, about 6% to about 15%, and about 8% to about 10%. Other suitable fluctuation amounts includes about 0, 2, 4, 6, 8, 10, 12, 14, 16, 18, 20, 22, 24, 26, 28, and 30%. Referring to FIG. 2, for example, the mold cavity pressure can be maintained at substantially constant atmospheric pressure during filling of substantially the entire mold cavity with the shot comprising molten thermoplastic material. Referring to FIG. 3, for example, the mold cavity pressure can be maintained substantially constant at a pressure greater than atmospheric pressure that is equal to the pre-injection pressure of the mold cavity. In another embodiment, the mold cavity pressure can be maintained at a substantially constant pressure that is greater than the pre-injection pressure of the mold cavity. For example, suitable mold cavity pressures for filling of the mold cavity include, for example, about 50 psi to about 500 psi.

The mold cavity can include, for example, one or more vents for maintaining the mold cavity pressure substantially constant. The vents can be controlled to open and close in order to maintain the substantially constant mold cavity pressure.

In one embodiment, a vacuum can be maintained in the mold cavity during injection and filling of substantially the entire mold cavity with the shot comprising molten thermoplastic. Maintaining a vacuum in the mold cavity during injection can advantageously reduce the amount of melt pressure required to fill the cavity, as there is no air to force from the mold cavity during filling. The lack of air resistance to the flow and the increased pressure drop between the melt pressure and the end of fill pressure can also result in a greater flow length of the shot comprising molten thermoplastic material.

Referring to FIG. 5, in another embodiment, the mold cavity pressure can increase during filling of substantially the entire mold cavity with the shot comprising molten thermoplastic material. For example, the mold cavity pressure can increase proportionally to the displaced volume of the mold cavity during filling. The increase in mold cavity pressure can occur, for example, at a substantially constant rate. The mold cavity can include a vent for maintaining the increasing mold cavity pressure below a predetermined set point. The predetermined set point can be, for example, about the melt pressure of the shot comprising molten thermoplastic material. The predetermined set point can also be, for example, a pressure above which could damage the mold cavity or adversely affect the quality of the injection molded part.

Once the mold cavity is completely filled with the shot comprising molten thermoplastic material and the material has cooled, the mold cavity pressure can be vented, if necessary, to atmospheric pressure and the mold can be opened to release the injection molded part.

Mold Cavity Temperature

In embodiments of the method, the mold cavity is maintained at room temperature or cooled prior to injection and filling of the mold cavity with the shot comprising molten thermoplastic material. While the mold cavity surfaces may increase in temperature upon contact with the molten thermoplastic material, an internal portion of the mold cavity spaced at least 2 mm, at least 3 mm, at least 4 mm, at least 5 mm, at least 6 mm, at least 7 mm, at least 8 mm, at least 9 mm, or at least 10 mm from the most immediate surface of the mold cavity contacting the shot comprising thermoplastic material is maintained at a lower temperature. Typically, this temperature is less than the no-flow temperature of the thermoplastic material. As used herein, the "no-flow temperature" refers to the temperature at which the viscosity of the thermoplastic material is so high that it effectively cannot be made to flow. In various embodiments, the internal portion of the mold can be maintained at a temperature of less than 100° C. For example, the internal portion can be maintained at a temperature of about 10° C. to about 99° C., about 20° C. to about 80° C., about 30° C. to about 70° C., about 40° C. to about 60° C., and about 20° C. to about 50° C. Other suitable temperatures include, about 10, 15, 20, 25, 30, 35, 40, 45, 50, 55, 60, 65, 70, 75, 80, 85, 90, 95, or 99° C. In one embodiment, the internal portion is maintained at a temperature of less than 50° C.

Heretofore, when filling at low constant pressure, the filling rates were reduced relative to conventional filling methods. This means the polymer would be in contact with the cool molding surfaces for longer periods before the mold would completely fill. Thus, more heat would need to be removed before filling, and this would be expected to result in the material freezing off before the mold is filled. It has been unexpectedly discovered that the thermoplastic material will flow when subjected to low, substantially constant pressure conditions despite a portion of the mold cavity being below the no-flow temperature of the thermoplastic material. It would be generally expected by one of ordinary skill in the art that such conditions would cause the thermoplastic material to freeze and plug the mold cavity rather than continue to flow and fill the entire mold cavity. Without intending to be bound by theory, it is believed that the low, substantially constant pressure conditions of embodiments of the disclosed method allow for dynamic flow conditions (i.e., constantly moving melt front) throughout the entire mold cavity during filling. There is no hesitation in the flow of the molten thermoplastic material as it flows to fill the mold cavity and, thus, no opportunity for freeze-off of the flow despite at least a portion of the mold cavity being below the no-flow temperature of the thermoplastic material. Additionally, it is believed that as a result of the dynamic flow conditions, the molten thermoplastic material is able to maintain a temperature higher than the no-flow temperature, despite being subjected to such temperatures in the mold cavity, as a result of shear heating. It is further believed that the dynamic flow conditions interfere with the formation of crystal structures in the thermoplastic material as it begins the freezing process. Crystal structure formation increases the viscosity of the thermoplastic material, which can prevent suitable flow to fill the cavity. The reduction in crystal structure formation and/or crystal structure size can allow for a decrease in the thermoplastic material viscosity as it flows into the cavity and is subjected to the low temperature of the mold that is below the no-flow temperature of the material.

In various embodiments, the mold can include a cooling system that maintains the entire mold cavity at a temperature below the no-flow temperature. For example, even surfaces of the mold cavity which contact the shot comprising molten thermoplastic material can be cooled to maintain a lower temperature. Any suitable cooling temperature can be used. For example, the mold can be maintained substantially at room temperature. Incorporation of such cooling systems can advantageously enhance the rate at which the as-formed injection molded part is cooled and ready for ejection from the mold.

Thermoplastic Material

A variety of thermoplastic materials can be used in the low, substantially constant pressure injection molding methods of the disclosure. In one embodiment, the molten thermoplastic material has a viscosity, as defined by the melt flow index of about 0.1 g/10 min to about 500 g/10 min, as measured by ASTM D1238 performed at a temperature of about 230 C and a weight of 2.16 kg. For example, for polypropylene the melt flow index can be in a range of about 0.5 g/10 min to about 200 g/10 min. Other suitable melt flow indexes include about 1 g/10 min to about 400 g/10 min, about 10 g/10 min to about 300 g/10 min, about 20 to about 200 g/10 min, about 30 g/10 min to about 100 g/10 min, about 50 g/10 min to about 75 g/10 min, about 0.1 g/10 min to about 1 g/10 min, or about 1 g/10 min to about 25 g/10 min. The MFI of the material is selected based on the application and use of the molded article. For examples, thermoplastic materials with an MFI of 0.1 g/10 min to about 5 g/10 min may be suitable for use as preforms for Injection Stretch Blow Molding (ISBM) applications. Thermoplastic materials with an MFI of 5 g/10 min to about 50 g/10 min may be suitable for use as caps and closures for packaging articles. Thermoplastic materials with an MFI of 50 g/10 min to about 150 g/10 min may be suitable for use in the manufacture of buckets or tubs. Thermoplastic materials with an MFI of 150 g/10 min to about 500 g/10 min may be suitable for molded articles that have extremely high L/T ratios such as a thin plate. Manufacturers of such thermoplastic materials generally teach that the materials should be injection molded using melt pressures in excess of 6000 psi, and often in great excess of 6000 psi. Contrary to conventional teachings regarding injection molding of such thermoplastic materials, embodiments of the low, constant injection molding method of the disclosure advantageously allow for forming quality injection molded parts using such thermoplastic materials and processing at melt pressures below 6000 psi, and possibly well below 6000 psi.

The thermoplastic material can be, for example, a polyolefin. Exemplary polyolefins include, but are not limited to, polypropylene, polyethylene, polymethylpentene, and polybutene-1. Any of the aforementioned polyolefins could be sourced from bio-based feedstocks, such as sugarcane or other agricultural products, to produce a bio-polypropylene or bio-polyethylene. Polyolefins advantageously demonstrate shear thinning when in a molten state. Shear thinning is a reduction in viscosity when the fluid is placed under compressive stress. Shear thinning can beneficially allow for the flow of the thermoplastic material to be maintained throughout the injection molding process. Without intending to be bound by theory, it is believed that the shear thinning properties of a thermoplastic material, and in particular polyolefins, results in less variation of the materials viscosity when the material is processed at low pressures. As a result, embodiments of the method of the disclosure can be less sensitive to variations in the thermoplastic material, for example, resulting from colorants and other additives as well as processing conditions. This decreased sensitivity to batch-to-batch variations of the properties thermoplastic material can also advantageously allow post-industrial and post-consumer recycled plastics to be processed using embodiments of the method of the disclosure. Post industrial and post consumer recycled plastics are derived from end products that have completed their life cycle and would otherwise have been disposed of as a solid waste product. Such recycled plastic, and blends of thermoplastic materials, inherently have significant batch-to-batch variation of their material properties.

The thermoplastic material can also be, for example, a polyester. Exemplary polyesters include, but are not limited to, polyethylene terphthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly(acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Other additives may include inorganic fillers such calcium carbonate, calcium sulfate, talcs, clays (e.g., nanoclays), aluminum hydroxide, CaSiO3, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically starch and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials such in the examples cited above. As well the different materials may be a combination of materials derived from virgin bio-derived or petroleum-derived materials, or recycled materials of bio-derived or petroleum-derived materials. One or more of the thermoplastic materials in a blend may be biodegradable. And for non-blend thermoplastic materials that material may be biodegradable.

Exemplary thermoplastic resins together with their recommended operating pressure ranges are provided in the following chart:

| Material | Full Name | Injection Pressure Range (PSI) | Company | Material Brand Name |
|---|---|---|---|---|
| PP | Polypropylene | 10000-15000 | RTP Imagineering Plastics | RTP 100 series Polypropylene |
| Nylon | | 10000-18000 | RTP Imagineering Plastics | RTP 200 series Nylon |
| ABS | Acrylonitrile Butadiene Styrene | 8000-20000 | Marplex | Astalac ABS |
| PET | Polyester | 5800-14500 | Asia International | AIE PET 401F |
| Acetal Copolymer | | 7000-17000 | API Kolon | Kocetal |
| PC | Polycarbonate | 10000-15000 | RTP Imagineering Plastics | RTP 300 series Polycarbonate |
| PS | Polystyrene | 10000-15000 | RTP Imagineering Plastics | RTP 400 series |
| SAN | Styrene Acrylonitrile | 10000-15000 | RTP Imagineering Plastics | RTP 500 series |
| PE | LDPE & HDPE | 10000-15000 | RTP Imagineering Plastics | RTP 700 Series |
| TPE | Thermoplastic Elastomer | 10000-15000 | RTP Imagineering Plastics | RTP 1500 series |
| PVDF | Polyvinylidene Fluoride | 10000-15000 | RTP Imagineering Plastics | RTP 3300 series |
| PTI | Polytrimethylene Terephthalate | 10000-15000 | RTP Imagineering Plastics | RTP 4700 series |
| PBT | Polybutylene Terephthalate | 10000-15000 | RTP Imagineering Plastics | RTP 1000 series |
| PLA | Polylactic Acid | 8000-15000 | RTP Imagineering Plastics | RTP 2099 series |

While more than one of the embodiments involves filling substantially the entire mold cavity with the shot comprising the molten thermoplastic material while maintaining the melt pressure of the shot comprising the molten thermoplastic material at a substantially constant pressure of less than 6000 psi, specific thermoplastic materials benefit from the invention at different constant pressures. Specifically: PP, nylon, PC, PS, SAN, PE, TPE, PVDF, PTI, PBT, and PLA at a substantially constant pressure of less than 10000 psi; ABS at a substantially constant pressure of less than 8000 psi; PET at a substantially constant pressure of less than 5800 psi; Acetal copolymer at a substantially constant pressure of less than 7000 psi; plus poly(ethylene furanate) polyhydroxyalkanoate, polyethylene furanoate (aka PEF) at substantially constant pressure of less than 10000 psi, or 8000 psi, or 7000 psi or 6000 psi, or 5800 psi.

As described in detail above, embodiments of the disclosed low, substantially constant pressure method can achieve one or more advantages over conventional high pressure injection molding processes, prior art high constant pressure injection molding processes, and prior art lower pressure injection molding process. For example, embodiments include a more cost effective and efficient process that eliminates the need to balance the pre-injection pressures of the mold cavity and the thermoplastic materials, a process that allows for use of atmospheric mold cavity pressures and, thus, simplified mold structures that eliminate the necessity of pressurizing means, the ability to use lower hardness, high thermal conductivity mold cavity materials that are more cost effective and easier to machine, a more robust processing method that is less sensitive to variations in the temperature, viscosity, and other material properties of the thermoplastic material, and the ability to produce quality injection molded parts at low pressures without premature hardening of the thermoplastic material in the mold cavity and without the need to heat or maintain constant temperatures in the mold cavity.

In one example, sample parts were molded using a low constant pressure process below 6000 PSI of injection pressure.

Samples were isolated from the injection molded parts using a common laboratory microtome. At least four samples were taken from each injection molded part. The cross section of the samples were then prepared to expose the compositional layers (skin, core, etc.) of each sample.

Synchrotron measurements were taken at Deutsches Elektronen Synchrotron (DESY) beamline G3 at DORIS III with the MAXIM detector ensemble, i.e. first measurements were taken by the point averaging scintillation counting device to obtain overviews of sample diffraction. Spatially resolved diffraction images were then taken by the position sensitive camera of MAXIM (a 2D detector Hamamatsu 4880 with multichannel plate [MCP] in front of its CCD sensor).

Synchrotron measurements revealed that injection molded parts having a certain thickness, that were molded using a low constant pressure process show a distinct and discernible extra band or zone of oriented polypropylene crystallites (see the red arrow in the figure below) in the core of the part. This extra zone of oriented material can be seen in parts molded using either steel or aluminum molds. Parts molded using a conventional, higher pressure process usually have a reduced number of oriented bands when compared to a part molded using a low constant pressure process.

Parts molded using a low constant pressure process may have less molded-in stress. In a conventional process, the velocity-controlled filling process combined with a higher transfer or switchover to pressure control may result in a part with high levels of undesirable molded-in stress. If the pack pressure is set too high in a conventional process, the part will often have an over-packed gate region. The molded-in stress can be visually assessed by placing the parts on a cross-polarized light table. The birefringence observed in molded parts can be used to observe differences in molded-in stress. Typically this is observed as patterns of stress lines in the part. The greater the number of lines and/or the non-uniformity of the stress lines is typically undesirable.

It is noted that the terms "substantially," "about," and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 5% of the stated reference.

It should now be apparent that the various embodiments of the products illustrated and described herein may be produced by a low, substantially constant pressure molding process. While particular reference has been made herein to products for containing consumer goods or consumer goods products themselves, it should be apparent that the molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    (a) filling with a shot comprising a molten thermoplastic material a mold cavity of a molding apparatus, the shot comprising the molten thermoplastic material having a melt pressure that, upon injection into the mold cavity, exceeds a pre-injection pressure of the shot comprising the molten thermoplastic material; and,
    (b) while filling substantially the entire mold cavity with the shot comprising the molten thermoplastic material, maintaining the melt pressure substantially constant at less than 6000 psi,
    wherein:
    the thermoplastic material has a melt flow index of about 0.1 g/10 min to about 500 g/10 min,
    the molding apparatus comprising heated runners in fluid communication with the mold cavity.

2. The method of claim 1, wherein the molding apparatus comprises two or more mold cavities and the heated runners are in fluid communication with the two or more mold cavities.

3. A method comprising:
    (a) filling with a shot comprising a molten thermoplastic material a mold cavity of a molding apparatus, the shot comprising the molten thermoplastic material having a melt pressure that, upon injection into the mold cavity, exceeds a pre-injection pressure of the shot comprising the molten thermoplastic material; and,
    (b) while filling substantially the entire mold cavity with the shot comprising the molten thermoplastic material, maintaining the melt pressure substantially constant at less than 6000 psi,
    wherein:
    the thermoplastic material has a melt flow index of about 0.1 g/10 min to about 500 g/10 min, and wherein the melt pressure of the shot comprising molten thermoplastic material is reduced to a pack pressure that is at least 50% of the melt pressure when the mold cavity is at least about 70% filled.

4. A method comprising:
    (a) filling with a shot comprising a molten thermoplastic material a mold cavity of a molding apparatus, the shot comprising the molten thermoplastic material having a melt pressure that, upon injection into the mold cavity, exceeds a pre-injection pressure of the shot comprising the molten thermoplastic material; and,
    (b) while filling substantially the entire mold cavity with the shot comprising the molten thermoplastic material, maintaining the melt pressure substantially constant at less than 6000 psi,
    wherein:
    the thermoplastic material has a melt flow index of about 0.1 g/10 min to about 500 g/10 min, wherein injection or filling of the shot comprising the molten thermoplastic material into the mold cavity comprises applying a hydraulic pressure to the shot comprising the molten thermoplastic material, and wherein maintaining the constant melt pressure comprises monitoring the melt pressure of the shot comprising the molten thermoplastic material upon injection into the mold cavity and the melt pressure of the shot comprising the molten thermoplastic material during filling of the mold cavity, and adjusting the hydraulic pressure applied to the shot comprising the molten thermoplastic material during injection into the mold cavity.

* * * * *